United States Patent
Baldwin et al.

(10) Patent No.: US 9,454,309 B2
(45) Date of Patent: *Sep. 27, 2016

(54) MANAGEMENT OF A SECURE DELETE OPERATION

(71) Applicant: International Business Machines Corporation, Armonk, NY (US)

(72) Inventors: Duane M. Baldwin, Mantorville, MN (US); John T. Olson, Tucson, AZ (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,985

(22) Filed: Mar. 10, 2016

(65) Prior Publication Data
US 2016/0196071 A1    Jul. 7, 2016

Related U.S. Application Data

(63) Continuation of application No. 14/073,519, filed on Nov. 6, 2013, now Pat. No. 9,317,363.

(51) Int. Cl.
*G06F 12/00* (2006.01)
*G06F 3/06* (2006.01)
(Continued)

(52) U.S. Cl.
CPC .......... *G06F 3/0608* (2013.01); *G06F 3/0652* (2013.01); *G06F 3/0683* (2013.01); *G06F 12/0813* (2013.01); *G06F 11/1076* (2013.01); *G06F 2211/1009* (2013.01); *G06F 2211/1047* (2013.01)

(58) Field of Classification Search
USPC ......................................................... 711/166
See application file for complete search history.

(56) References Cited

U.S. PATENT DOCUMENTS 6,070,174 A    5/2000    Starek et al.
7,650,473 B1   1/2010    Tormasov et al.
(Continued)

OTHER PUBLICATIONS

"DoD 5220.22-M National Industrial Security Program Operating Manual (NISPOM)", Department of Defense—Department of Energy—Nuclear Regulatory Commission—Central Intelligence Agency, Jan. 1995, 114 pages, US Government Printing Office, Washington, D.C. http://www.usaid.gov/policy/ads/500/d522022m.pdf.

(Continued)

*Primary Examiner* — Mardochee Chery
(74) *Attorney, Agent, or Firm* — Laura E. Gisler; Jennifer M. Anda (57) ABSTRACT

Embodiments of the disclosure can include a method, system, and computer program product for using a secure delete operation within one or more storage devices using a parity-based storage scheme. The method can include receiving the location of an application block that includes one or more data blocks and one or more parity blocks stored within the one or more storage devices using the parity-based storage scheme. The method can also include determining a number of parity blocks to delete, wherein the number of parity blocks to delete is less than the total number of parity blocks. The method can also include performing a secure delete operation on the determined number of parity blocks. The method can also include performing a secure delete operation on the one or more data blocks.

9 Claims, 7 Drawing Sheets

(51) Int. Cl.
  *G06F 12/08* (2016.01)
  *G06F 11/10* (2006.01)

(56) References Cited

U.S. PATENT DOCUMENTS

| | | |
|---|---|---|
| 7,739,462 B2 | 6/2010 | Dewey |
| 7,831,560 B1 | 11/2010 | Spertus et al. |
| 8,051,362 B2 | 11/2011 | Li et al. |
| 8,474,032 B2 | 6/2013 | Fetik |
| 2005/0166016 A1* | 7/2005 | Morimoto ............ G06F 11/1076 711/114 |
| 2008/0276146 A1 | 11/2008 | Hetzler et al. |
| 2009/0083590 A1 | 3/2009 | Wylie et al. |
| 2010/0058072 A1 | 3/2010 | Teow et al. |
| 2010/0083069 A1 | 4/2010 | Wylie et al. |
| 2010/0174865 A1 | 7/2010 | Koester |
| 2011/0029840 A1 | 2/2011 | Ozzie et al. |
| 2011/0154060 A1 | 6/2011 | Guyot et al. |
| 2011/0289271 A1 | 11/2011 | Nagpal et al. |
| 2012/0023303 A1 | 1/2012 | Russo et al. |
| 2012/0278579 A1 | 11/2012 | Goss et al. |
| 2013/0067273 A1 | 3/2013 | Fiske et al. |
| 2014/0022849 A1 | 1/2014 | Krutzik et al. |
| 2014/0201478 A1 | 7/2014 | Gunda et al. |
| 2015/0074368 A1 | 3/2015 | Islam |
| 2015/0127919 A1 | 5/2015 | Baldwin et al. |

OTHER PUBLICATIONS

"Technical Security Standard for Information Technology (TSSIT)," Royal Canadian Mounted Police, Aug. 1997, 81 pages, Protected by Crown Copyright. http://www.iwar.org.uk/comsec/resources/standards/canada/tssit97e.pdf.

* cited by examiner

MANAGEMENT OF A SECURE DELETE OPERATION

FIELD

This disclosure generally relates to storage environments accessed by computing systems, and in particular, to managing the secure delete of data from storage volumes within a storage environment.

BACKGROUND

In a storage environment where data is stored on a volume, there are times when a complete secure delete of the data may be desired. Within existing storage disks, because the data is stored on the volume in tracks, to erase these tracks, an I/O operation must be performed to each track of the device to overwrite the existing data. As a further complication to the secure delete process, due to the nature of magnetic recording, it may be possible to access previously-written data on a disk even though it may have been written over more than once. Therefore, to prevent the possibility of accessing previously-written data, current secure delete methods write random patterns on the physical media many times in order to ensure that no previously-written data is accessible.

SUMMARY

Embodiments of the disclosure can include a method, a system, and a computer program product for using a secure delete operation within one or more storage devices using a parity-based storage scheme. The method can include receiving the locations of an application block that include one or more data blocks and one or more parity blocks stored within the one or more storage devices using the parity-based storage scheme. The method can also include determining a number of parity blocks to delete, wherein the number of parity blocks to delete is less than the total number of parity blocks. The method can also include performing a secure delete operation on the determined number of parity blocks. The method can also include performing a secure delete operation on the one or more data blocks.

BRIEF DESCRIPTION OF THE DRAWINGS

Like reference numbers and designations in the various drawings indicate like elements.

DETAILED DESCRIPTION

Aspects of the present disclosure are directed toward managing a secure delete operation that is performed on less than all of a plurality of parity blocks from an application block. The application block can be distributed in a storage device employing a parity-based storage scheme. The storage device can also include one or more disk drives operating in a Redundant Array of Independent Disks (RAID). Although not necessarily limited thereto, embodiments of the present disclosure can be appreciated in the context of secure delete management.

Redundant Array of Independent Disks (RAID), is a technology that provides increased storage functions and reliability through redundancy. This is achieved by combining multiple disk drive components into a logical unit, where data is distributed across the drives in one of several ways called "RAID levels." RAID is an example of storage virtualization. RAID is now used as an umbrella term for computer data storage schemes that can divide and replicate data among multiple physical disk drives. The physical disks are said to be in an array, or RAID array, which is accessed by the operating system as one single disk. The different schemes or architectures are named by the word RAID followed by a number (e.g., RAID 0, RAID 1). Each scheme provides a different balance between two key goals: increase data reliability and increase input/output performance.

A number of standard schemes have evolved which are referred to as levels. There were five RAID levels originally conceived, but many more variations have evolved, notably several nested levels and many non-standard levels (mostly proprietary).

RAID 0 (block-level striping without parity or mirroring has no (or zero) redundancy. RAID 0 provides improved performance and additional storage but no fault tolerance. Simple stripe sets are normally referred to as RAID 0. Any disk failure destroys the array, and the likelihood of failure increases with more disks in the array. A single disk failure destroys the entire array because when data is written to a RAID 0 volume, the data is broken into fragments called blocks. The number of blocks is dictated by the stripe size, which is a configuration parameter of the array. The blocks are written to their respective disks simultaneously on the same sector. This allows smaller sections of the entire chunk of data to be read off the drive in parallel, increasing bandwidth. RAID 0 does not implement error checking, so any error is uncorrectable. More disks in the array means higher bandwidth, but greater risk of data loss.

In RAID 1 (mirroring without parity or striping), data is written identically to multiple disks (a "mirrored set"). The array continues to operate as long as at least one drive is functioning. With appropriate operating system support, there can be increased read performance, and only a minimal write performance reduction; implementing RAID 1 with a separate controller for each disk in order to perform simultaneous reads (and writes) is sometimes called multiplexing (or duplexing when there are only 2 disks).

In RAID 2 (bit-level striping with dedicated Hamming-code parity), all disk spindle rotation is synchronized, and data is striped such that each sequential bit is on a different disk. Hamming-code parity is calculated across corresponding bits on disks and stored on at least one parity disk.

In RAID 3 (byte-level striping with dedicated parity), all disk spindle rotation is synchronized, and data is striped so each sequential byte is on a different disk. Parity is calculated across corresponding bytes on disks and stored on a dedicated parity disk.

RAID 4 (block-level striping with dedicated parity) is identical to RAID 5 (see below), but confines all parity data to a single disk, which can create a performance bottleneck. In this setup, files can be distributed between multiple disks. Each disk operates independently which allows I/O requests to be performed in parallel, though data transfer speeds can suffer due to the type of parity. The error detection is achieved through dedicated parity and is stored in a separate, single disk unit.

RAID 5 (block-level striping with distributed parity) distributes parity along with the data and requires all drives but one to be present to operate; the array is not destroyed by a single drive failure. Upon drive failure, any subsequent reads can be calculated from the distributed parity such that the drive failure is masked from the end user. However, a single drive failure results in reduced performance of the entire array until the failed drive has been replaced and the associated data rebuilt.

RAID 6 (block-level striping with double distributed parity) provides fault tolerance of two drive failures. The array continues to operate with up to two failed drives. This makes larger RAID groups more practical, especially for high-availability systems. This becomes increasingly important as large-capacity drives lengthen the time needed to recover from the failure of a single drive. Single-parity RAID levels are as vulnerable to data loss as a RAID 0 array until the failed drive is replaced and its data rebuilt. The larger the drive, the longer the rebuild takes. Double parity gives time to rebuild the array without the data being at risk if a single additional drive fails before the rebuild is complete.

An erasure code is a forward error correction (FEC) code for a binary erasure channel. The erasure code provides redundancy by breaking objects up into smaller fragments and storing the fragments in different places. Data can be recovered from any combination of a smaller number of those fragments. When recovering data, it is important to verify whether any fragment is corrupt. It is also important to identify the data to ensure immutability. A secure verification hashing scheme is required to both verify and identify data fragments.

Many RAID levels employ an error protection scheme called "parity." The XOR parity calculation is a widely used method in information technology to provide fault tolerance in a given set of data. In Boolean logic, there is an operation called exclusive or (XOR), meaning "one or the other, but not neither and not both." The XOR operator is central to how parity data is created and used within an array. It is used both for the protection of data, as well as for the recovery of missing data. Thus, a RAID controller must perform the XOR command every time a stripe is written to create parity.

Further complexities are involved when implementing secure delete methods on storage systems which utilize caching. After storage tracks are cached to memory, the tracks must also be destaged so that they are written to the physical media. Each destage of tracks requires another I/O operation across the channel. While this I/O is being performed, the tracks are not usable until the synchronous secure delete operation is finished. This causes problems because repeated I/O to each track is not only time consuming, but is also channel intensive. For example, if a user wished to erase all data on a volume within a 3390 Model 3 storage device that contains 3,339 cylinders with 15 heads per cylinder, this would result in 50,085 I/O instructions just to write over each track. In some circumstances, it may take numerous hours or even days for the data secure delete operation to be completed.

Due to the large number of times that the patterns must be written onto the disk and the large number of I/O operations necessary to destage a cached disk after a pattern is written to the tracks, the performance of a complete secure delete on a disk can become a very I/O and time intensive operation.

In the following description, specific details of various embodiments are provided. However, some embodiments may be practiced with less than all of these specific details. In other instances, certain methods, procedures, components, structures, and/or functions are described in no more detail than is necessary to enable the various embodiments of the disclosure, for the sake of brevity and clarity.

Figure 1:
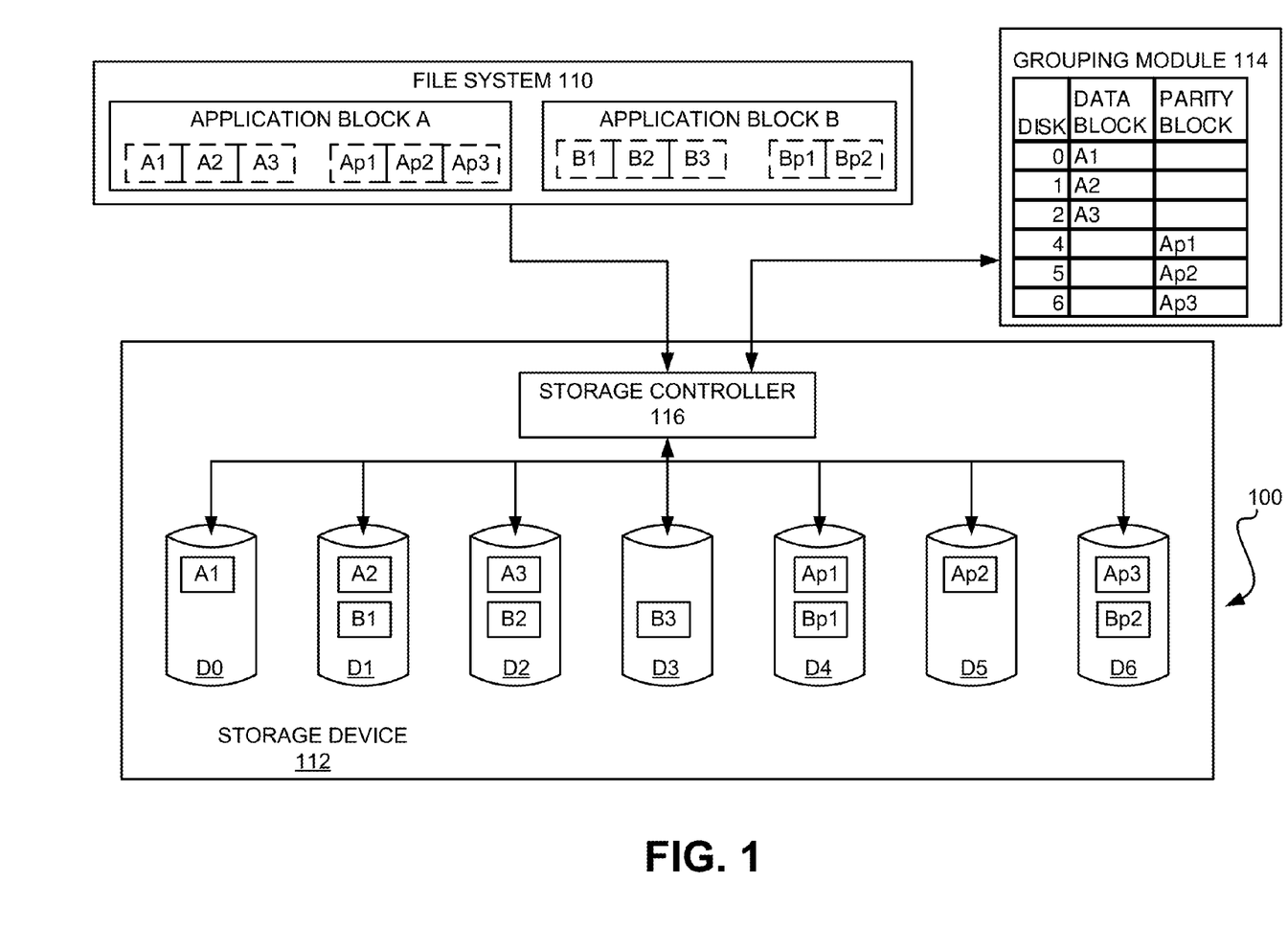
FIG. 1 illustrates a storage system that manages the placement of parity blocks and data blocks, according to various embodiments.

FIG. 1 illustrates a storage system 100 that manages the placement of parity blocks and data blocks, according to various embodiments. The storage system 100 can include a file system 110, storage devices 112, and a grouping module 114.

The file system 110 can be a software and/or hardware mechanism to store and organize electronic content, such as files and data stored in the files on the storage devices 112. The file system 110 generally allows a user to find, search for, and access the files stored on the storage device 112. Hence, in general, the file system 110 is a database for the storage, hierarchical organization, manipulation, navigation, access, and retrieval of files and data associated with the files. The file system 110 may include a disk file system, a flash file system, a database file system, a transactional file system, a network file system, and other similar file systems. The file system 110 may access data from a data storage device such as a hard disk or compact disk read only memory (CD-ROM) and involve the maintenance of the physical locations of the files. Additionally, the file system 110 may include access to data on a file server such as the server 102 of FIG. 1 by acting as a client for a network protocol. Additionally, the file system 110 may include a virtual filing system such as a process file system (procfs).

In various embodiments, the file system 110 can refer to application blocks used by a computer application. Application blocks can be used in a variety of situations, e.g., reading data for display, obtaining data, submitting changed data back to a database. Different applications can have different block sizes. For example, databases application block sizes can range from 8 k-64 k while video application can have 256 k block sizes or higher. The file system 110 is shown with two application blocks, application block A and application block B.

Each application block in the file system 110 can point to data blocks and parity blocks in the storage device 112. For instance, application block A can be associated with three data blocks, A1, A2, and A3, and three parity blocks Ap1, Ap2, and Ap3. The parity blocks can be combined with a data block to recover a corrupted or missing data block using methods commonly known in the art. Application block B can be associated with three data blocks B1, B2, and B3, and 2 parity blocks Bp1, and Bp2. Application block A and B will be used to illustrate the concepts behind embodiments of the disclosure.

In various embodiments, the storage device 112 can be referred to as an array in various embodiments. Throughout the disclosure, disk drives, disks or data storage can be used interchangeably and can include magnetic storage, or solid-state storage, such as a solid state drive. The storage device 112 can include one or more individual disk drives. For example, the array can include disks D0, D1, D2, D3, D4, D5, and D6. Each disk can be configured to hold one or more data blocks or parity blocks of application blocks associated with the file system 110. The array can use a parity-based storage scheme according to embodiments of the disclosure.

Each disk can be controlled by a storage controller 116. The storage controller 116 can be the same as a RAID controller in various embodiments. The storage controller 116 can manage the placement of the data and parity blocks onto the Array. For example, the storage controller 116 can assign the data block A2 and B1 to D1 and assign the parity block Ap2 and Bp2 to D5 and D6 respectively. The storage controller 116 can create new parity blocks based off of the data blocks and redistribute the parity block to any disk in the Array. In various embodiments, the storage controller 116 can also ensure that the data blocks are not co-located with the corresponding parity block used to reconstruct the data block.

The grouping module 114 can communicate with the storage controller 116 to determine the total number of data blocks and parity blocks within the storage device 112. The grouping module 114 can work off of an existing table found in the storage controller 116 or form a new table based off of tracking the movement of data and parity blocks within the storage devices 112.

Figure 2:
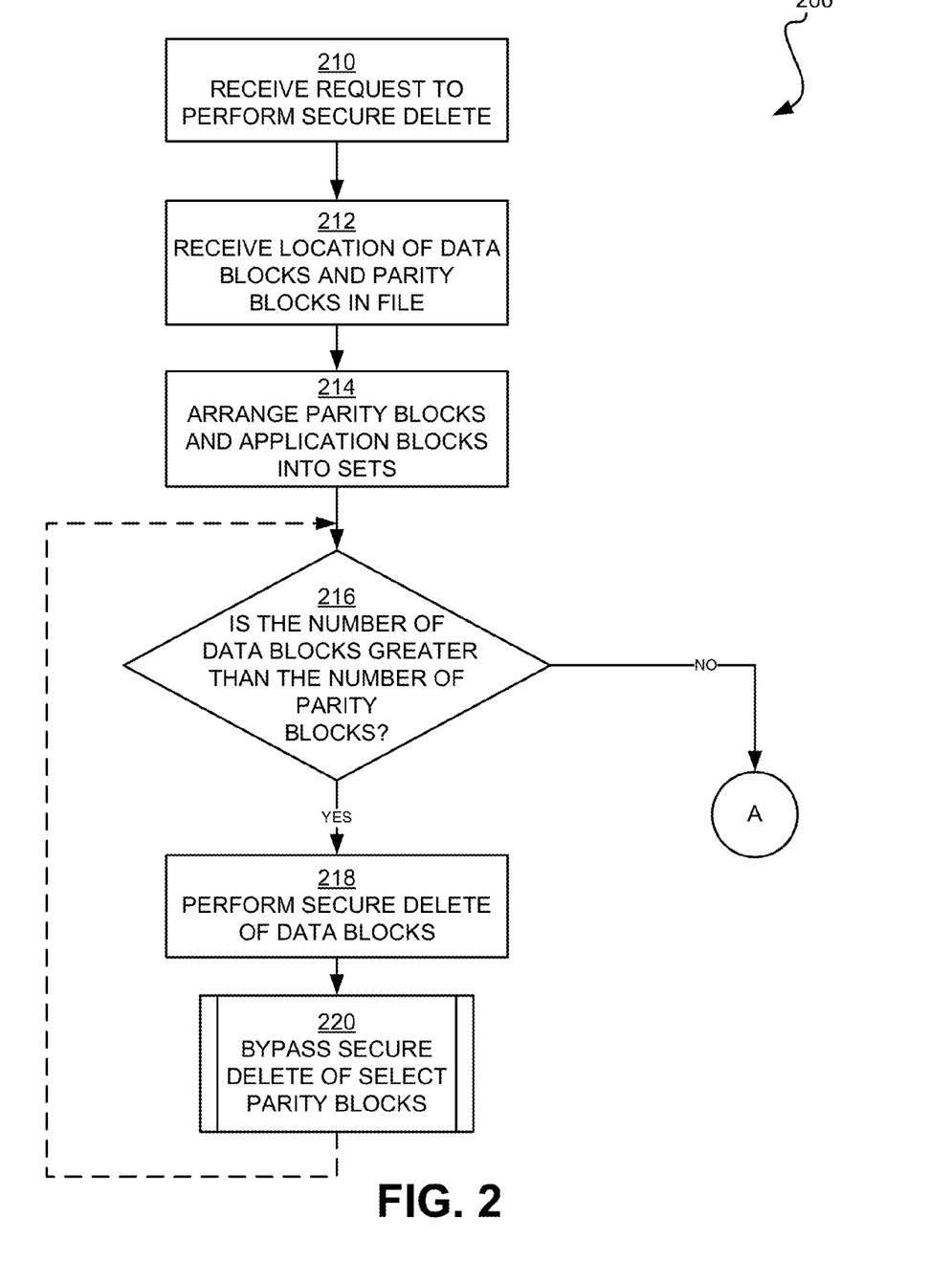
FIG. 2 illustrates a flowchart of a method for managing a secure delete operation on at least one parity block, according to various embodiments.

FIG. 2 illustrates a flowchart of a method 200 for managing a secure delete operation on at least one parity block, according to various embodiments. The secure delete operation, which can also be referred to as data clearing, erasure, or data wiping, is a software-based method of overwriting data that overwrites bits in several patterns for electronic data residing on a hard disk drive or other digital media.

Unlike degaussing and physical destruction, which render the storage media unusable, secure delete removes all information while leaving the disk operable, preserving IT assets and the environment. Software-based overwriting uses a secure delete application to write patterns of random meaningless data onto of a hard drive's sectors. Some of examples of standards for secure delete can be CMRR: DOD 5220-22-M standard defined clearing and sanitizing matrix http://www.usaid.gov/policy/ads/500/d522022m.pdf (page 58), and Royal Canadian Mounted Police Technical Security Standard for Information Technology, Appendix OPS-II—Media Sanitization. http://www.iwatorg.uk/comsec/resources/standards/canada/tssit97e.pdf The method 200 can apply to situations where the number of parity blocks is less than or equal to the number of data blocks or vice versa. The method 200 can begin at operation 210. In operation 210, a storage controller, e.g., storage controller 116 from FIG. 1, can receive a request to perform a secure delete from a secure delete application. The secure delete application can direct a storage device to perform a secure delete operation. The secure delete operation can occur using a number of techniques. For example, the secure delete operation can write the storage device with all 0s, or all 1s or any random character using any number of overwrite rounds. The number of overwrite rounds can be directed by the reliability of the underlying disk. For example, a magnetic hard disk can sustain upwards of 100 k overwrites for a single bit while a solid state drive can sustain fewer overwrites. After the secure delete request has been received, then the method 200 can continue to operation 212.

In operation 212, a grouping module, e.g., grouping module 114 in FIG. 1, can receive a location of data blocks and parity blocks from the storage controller or a file system. In various embodiments, the location of the data blocks and parity blocks is maintained at the storage controller and file system. The location of the data for the data and parity blocks can be copied into the grouping module either by pushing data to the grouping module or pulling data from the storage controller. After the location of data blocks and parity blocks are received, then the method 200 can continue to operation 214.

In operation 214, the received location of the data and parity blocks can be arranged into sets by the grouping module. The sets can be based on the file associations. For example, the set can include data blocks and another set can include parity blocks. The data block set can be further grouped by the data blocks that correspond to a particular application block. In various embodiments, the set does not have to be in a particular order. After the data block and parity block are grouped into sets, then the method 200 can continue to operation 216.

In operation 216, the set from the grouping module can be used to compare whether the number of data blocks is greater than the number of parity blocks. The grouping module can perform the comparison or the comparison can be performed by another module. If the grouping module determines that there are more data blocks than parity blocks, the method 200 can continue to operation 218. If the grouping module determines that there are more parity blocks than data blocks, then the method 200 can continue to process A (depicted herein).

In operation 218, the secure delete application can perform a secure delete, or secure delete operation, on the data blocks according to data secure delete techniques such as a triple random write. The secure delete can occur on the data blocks that are on one or more storage devices. In various embodiments, the secure delete application can perform the secure delete operation on a particular sequence of data blocks. For example, the secure delete application can have a policy that says a first data block must be deleted before a second data block is deleted. After the secure delete operation on the data blocks, then the method 200 can continue to operation 220.

In operation 220, the secure delete application can bypass select parity blocks for the secure delete operation. In various embodiments, the parity blocks can be selected for secure deletion before the secure delete. The parity blocks can also be selected using a decision analysis method, such as the method depicted in FIG. 4. The secure delete application can also have a policy where a certain number of parity blocks are deleted automatically as discussed herein.

Figure 3:
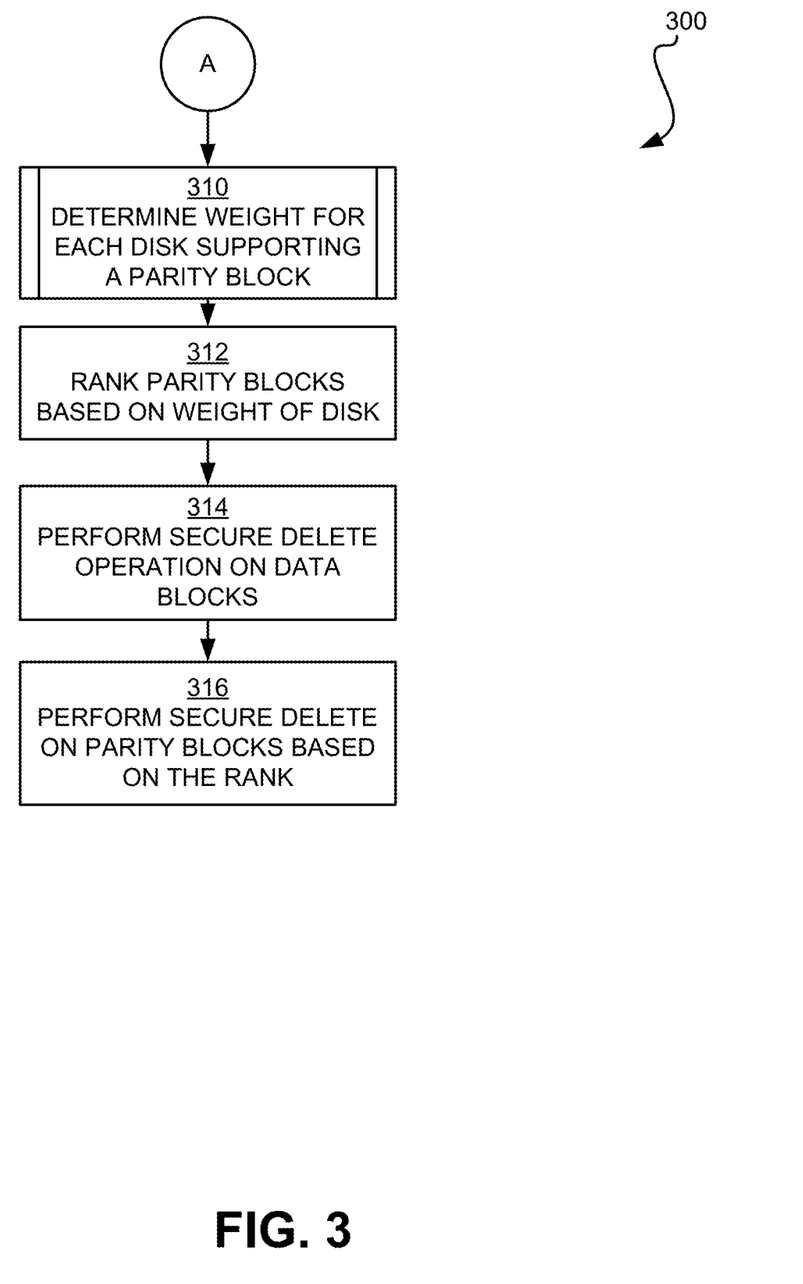
FIG. 3 illustrates a method for bypassing a secure delete operation on at least one parity block, according to various embodiments.

FIG. 3 illustrates a method 300 for bypassing a secure delete operation on at least one parity block, according to various embodiments. The method 300 can continue from process A depicted on FIG. 2. The method 300 can begin at operation 310.

In operation 310, the weighing module can obtain a weight for each disk, drive, or partition that support a parity block. The weight can be a measurement of the accessibility of the disk. For example, a highly accessed disk can have a high weight while a lightly accessed disk can have a low weight. The weight can also be adjusted by factoring the sensitivity of the content of data obtained on the disk. For example, a disk with highly sensitive information can have a higher weight than a publicly disclosed disk. Other examples of how the weight can be determined are discussed in FIG. 5. After the weight is determined for each disk, then the method 300 can continue to operation 312.

In operation 312, a ranking module or the weighing module can rank the parity blocks based on the weight of the disk. A high weight disk can be ranked higher than a low weight disk. In various embodiments, the ranking can be customized by the secure delete application. For example, the secure delete application can adjust the weight for each disk or give the lowest weight disk the highest rank. After the parity blocks are ranked, then the method can continue to operation 314.

In operation 314, the secure delete application can perform a secure delete operation of the data blocks, similar to operation 218 in FIG. 2. After the secure delete application has performed the secure delete operation on the data blocks, then the method 300 can continue to operation 316.

In operation 316, the secure delete application can perform a secure delete operation on less than all of the parity blocks. The number of parity blocks to be deleted can be determined by the following formula: $Number_{ParityBlockstoDelete} = Number_{ParityBlocks} - Number_{DataBlocks} + 1$. Thus, the number of parity blocks to delete is the difference between the number of parity blocks and data blocks plus one. In various embodiments, other formulas can be used to determine the number of parity blocks to delete and can be based on the likelihood of reconstructing the parity blocks into a data block.

Once the number of parity blocks to delete is determined, the secure delete application can delete the parity blocks in the ranking order. For example, if a first parity block and a second parity block exist in the storage device, with the first parity block having a higher rank than the second parity block, then the secure delete application can delete the first parity block before the second parity block. If only one parity block is to be deleted, then only the first parity block is deleted.

Figure 4:
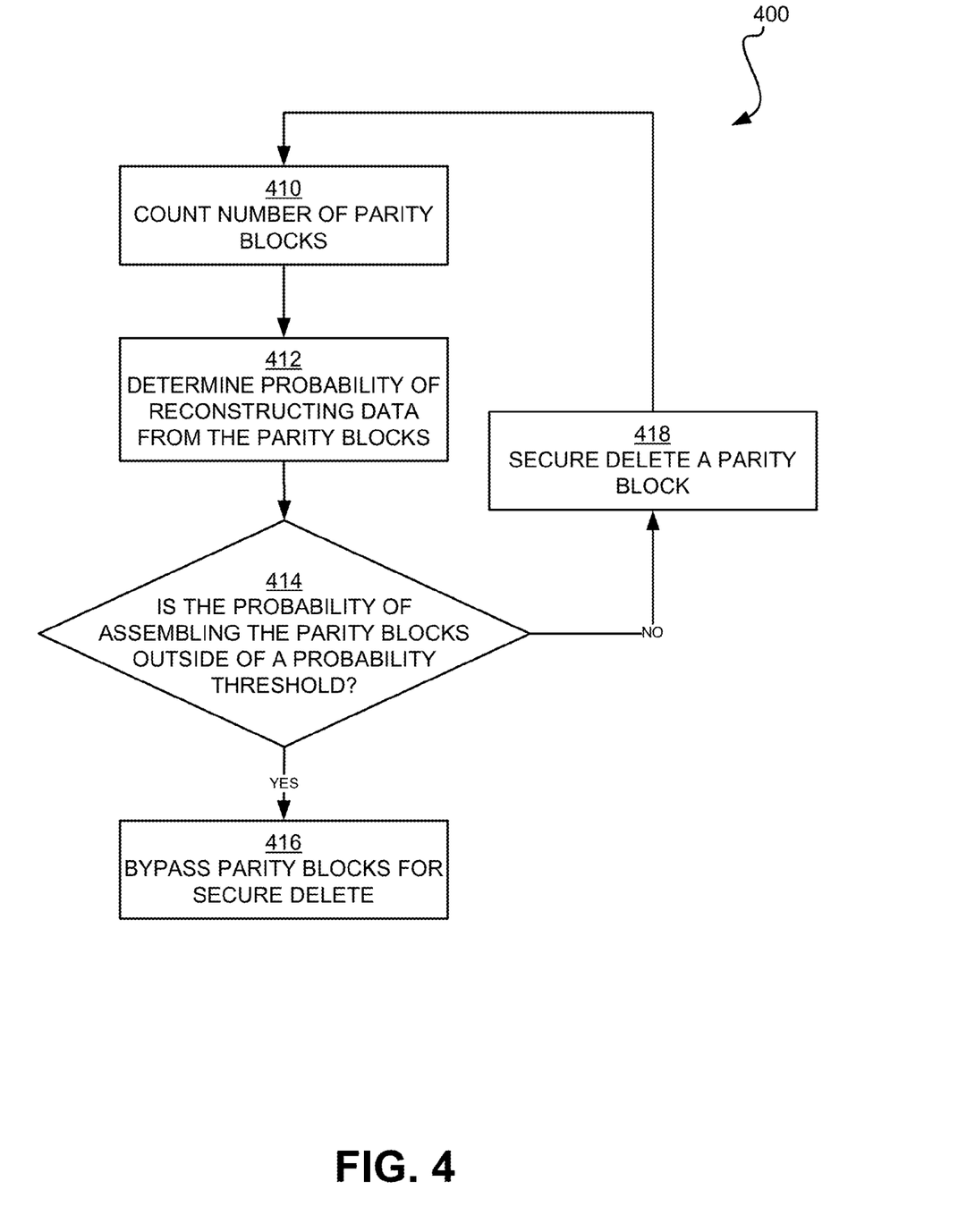
FIG. 4 illustrates a method of bypassing a secure delete function for a parity block, according to various embodiments.

FIG. 4 illustrates a method 400 of bypassing a secure delete function for a parity block, according to various embodiments. The method 400 can correspond to operation 220 from FIG. 2. In certain embodiments, parity blocks can reconstruct data without the use of a data block through making assumptions about the content of the data block. The method 400 can involve determining a probability of reconstructing data from a parity block and removing parity blocks to decrease the chances of reconstruction of data. The method 400 can begin at operation 410.

In operation 410, the number of parity blocks are counted. Operation 410 can correspond to a counting operation, e.g., operation 216 in FIG. 2. After the number of parity blocks are counted, then the method 400 can continue to operation 412. In operation 412, the secure delete application can determine the probability of reconstructing data from the parity blocks.

The probability of reconstructing data can depend on the number of parity blocks originally in the storage device. This number can be compared with the number of data blocks that were in the storage device before the secure delete operation. For instance, if there were only two data blocks and one parity block in the storage device, and a parity bit of one is in the parity block then the probability of reconstructing the data can be 25% since the data block can have either two zeros or two ones. The probability for recovering data from one parity block would be higher than recovering a greater number of data blocks from parity blocks in the storage device. Likewise, the probability of reconstructing the data is reduced even further if some of the parity blocks were removed. After the probability of reconstructing the data blocks from the parity blocks is determined, then the method 400 can continue to operation 414.

In operation 414, the probability determined from operation 412 can be compared with a probability threshold. The probability threshold can be determined by the secure delete application. For instance, the secure delete application's policy can determine whether to have a high probability threshold or a low probability threshold. If the determined probability is outside the probability threshold, then the secure delete application can continue to operation 416. For example, if the probability threshold can be 1%, and the determined probability is 0.5%, then the secure delete application can continue to operation 416. If the determined probability is within the probability threshold, then the secure delete application can continue to operation 418.

In operation 416, the secure delete application can bypass the secure delete operation on one or more parity blocks. In various embodiments, a less intensive delete operation can occur in lieu of bypassing the secure delete operation. For example, if the parity block has a low probability of reconstruction, then the secure delete application can perform a less intensive delete operation on the parity block, instead of bypassing the secure delete operation on the parity block. A less intensive delete operation can include any delete operation that uses fewer overwrite passes or overwrites than the secure delete operation. For example, a less intensive delete operation can use a single-pass zero bit overwrite, or a single-pass random bit overwrite if the secure delete operation uses a zero and random bit double-pass overwrite. A less intensive delete operation can include an index removal, when the secure delete operation uses a single-pass zero bit overwrite. The bypassing of a secure delete operation can include performing a delete operation that involves the less intensive delete operation. The delete operation can apply to the remaining parity blocks other than the parity blocks identified for deletion in operation 418.

In operation 418, the secure delete application can perform the secure delete operation on a parity block. A secure delete operation can occur and the method 400 can continue to operation 410 where the effect of removing the parity block is examined. In various embodiments, the secure delete application can perform the secure delete operation on a particular order of parity blocks. The order can be determined by data sensitivity contained in the parity block. The secure delete operation can also be performed on groups of parity blocks simultaneously. For example, the secure delete application can determine that removing 2 out of 5 parity blocks will make the probability of reconstructing data blocks fall within the threshold.

Figure 5:
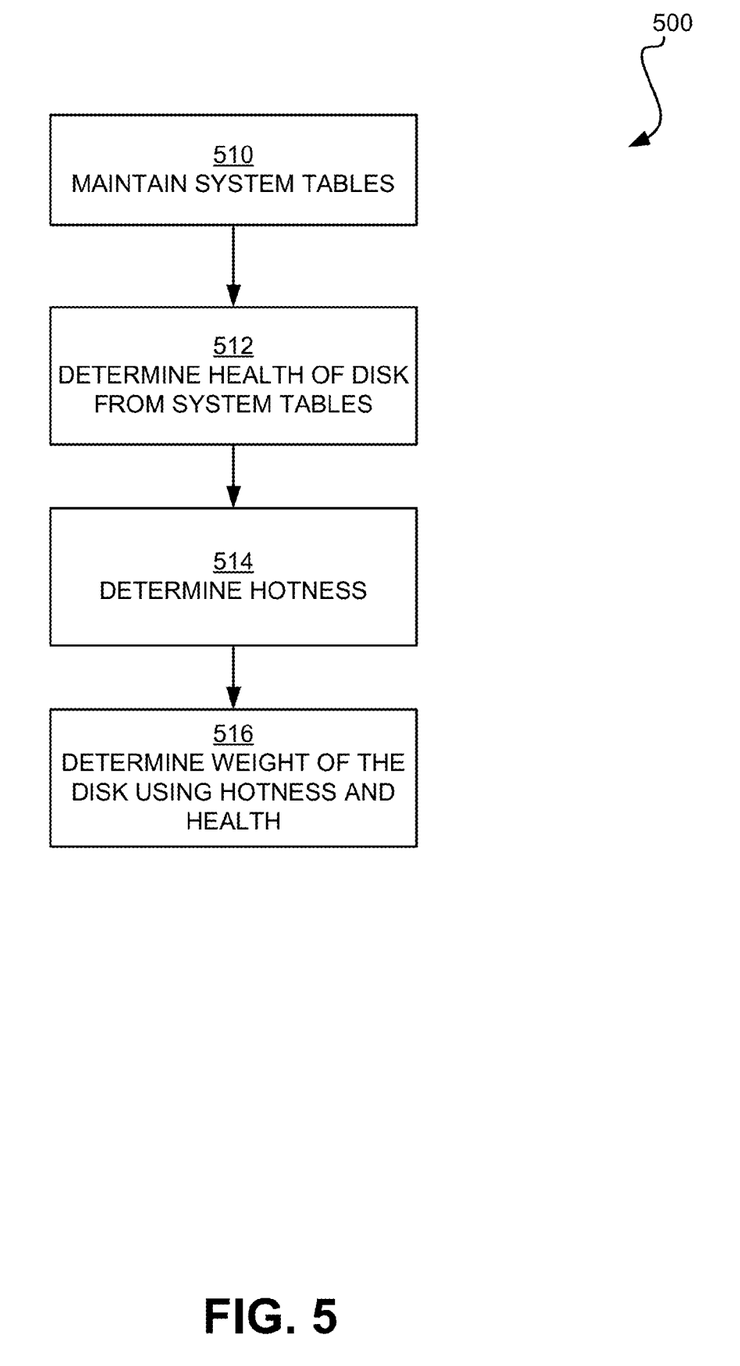
FIG. 5 illustrates a method of determining the weight of the disk, according to various embodiments.

FIG. 5 illustrates a method 500 of determining the weight of the disk, according to various embodiments. The method 500 can correspond to operation 310 from FIG. 3. Generally, the method 500 can determine the weight of the disk by measuring the health of each disk using system tables and determining the hotness of a particular disk. The disks with the higher weight will generally have the best health with the least amount of access. The method 500 can begin with operation 510.

In operation 510, the system tables can be maintained by the storage controller. The system tables can be automatically maintained by the storage controller using techniques commonly known in the art. The system tables for each disk in the storage system can have a static component and a dynamic component. The static component can have parameters that do not change, while the dynamic component can have parameters that can be continuously changing. Examples of static parameters are shown on Table 1.

TABLE 1

Disk Static parameter information:

| DiskVendor | VendorWeight | Mean Time Between Failures (MTBF) | Read Performance | Write Performance | Availability | Durability |
|---|---|---|---|---|---|---|
| IBM ® | 100 | 10 | 2 | 2 | 100 | 8 |
| IBM ® | 80 | 10 | 1.4 | 2.1 | 90 | 6 |

The dynamic component parameters, or dynamic parameters, can include Self Monitoring, Analysis & Reporting Technology (SMART) parameters/values defined by the drive manufacturers. Examples of SMART parameters include:

Head Flying Height: A downward trend in flying height will often presage a head crash.

Number of Remapped Sectors: If the drive is remapping many sectors due to internally detected errors, this can mean the drive is starting to go.

ECC Use and Error Counts: The number of errors encountered by the drive, even if corrected internally, often signal problems developing with the drive. The trend is in some cases more important than the actual count.

Spin-Up Time: Changes in spin-up time can reflect problems with the spindle motor.

Temperature: Increases in drive temperature often signal spindle motor problems.

Data Throughput: Reduction in the transfer rate of the drive can signal various internal problems.

TABLE 2

Dynamic SMART Parameters:

| DeviceID | Vendor | SMART Parameters | | | |
|---|---|---|---|---|---|
| | | PARAM1 | PARAM2 | PARAM3 | PARAM4 |
| 1 | IBM ® | 40 | 1000 | 500 | 25 |
| 2 | IBM ® | 50 | 2500 | 800 | 30 |

Table 2 shows examples of how the dynamic parameters are measured. Table 2 can be updated periodically in fixed set intervals, according to various embodiments. Both Table 1 and Table 2 can be updated whenever new disk is added/deleted from the storage devices. After the system tables are maintained, then the method 500 can continue to operation 512.

In operation 512, the health of a particular disk is determined by using information about the static and dynamic parameters. Examples of the health are shown on Table 3. The health can be determined using the following formula:

$$HealthofDisk = \beta * StaticParamValue + d * DynamicParamValue + Vendorweight$$

The values for β and d are system defined constants. The StaticParamValue is an aggregate of the various static parameters, and the DynamicParamValue is an aggregate of the dynamic parameters. The aggregation of the static and dynamic parameters can use constants to ensure that the units of the parameters are compatible. For example, a MTBF value can be measured in years while a Read Performance can be measured in MB/s. The Vendorweight can be defined by the disk Vendor.

TABLE 3

Health of Disk Matched to Disks.

| Disk ID | HeathOfDisk(0-100) |
|---|---|
| 1 | 90 |
| 2 | 85 |
| 3 | 80 |
| 4 | 95 |
| 5 | 90 |
| 6 | 85 |
| 7 | 80 |
| 8 | 90 |
| 9 | 97 |
| 10 | 94 |

Table 3 illustrates an example of how the HealthofDisk can be matched with a particular disk. After the health of disk is determined, the method 500 can continue to operation 514.

In operation 514, the storage controller can also measure the hotness of a particular disk. The hotness can be defined by a usage of the disk or the frequency of disk access. The hotness can be determined by measuring the total number of accesses and the recent number of accesses, and aggregating the result. Examples of access information can be used by the storage controller is shown on Table 4. After the hotness of a particular disk is determined, then the method 500 can continue to operation 516.

TABLE 4

Disk Access information table

| DiskID | TotalNoOfAccesses | RecentNoOfAccesses | Hotness |
|---|---|---|---|
| 1 | 10000 | 100 | 10100 |
| 2 | 11000 | 110 | 11110 |
| 3 | 12000 | 120 | 12120 |
| 4 | 10000 | 900 | 10900 |
| 5 | 11000 | 800 | 11800 |
| 6 | 9000 | 230 | 9230 |
| 7 | 10000 | 420 | 10420 |
| 8 | 10340 | 889 | 11229 |
| 9 | 11230 | 560 | 11790 |
| 10 | 9990 | 234 | 10224 |

In operation 516, the weight of the disk can be determined using the hotness and the health of a particular disk. The weight for each disk can be determined by the following formula:

$$\text{Weight of the disk} = A * HealthofDisk - B * \text{Hotness of disk}$$

where A and B are system defined constants that can standardize the units of the HeathofDisk variable and the Hotness of disk variable.

Figure 6:
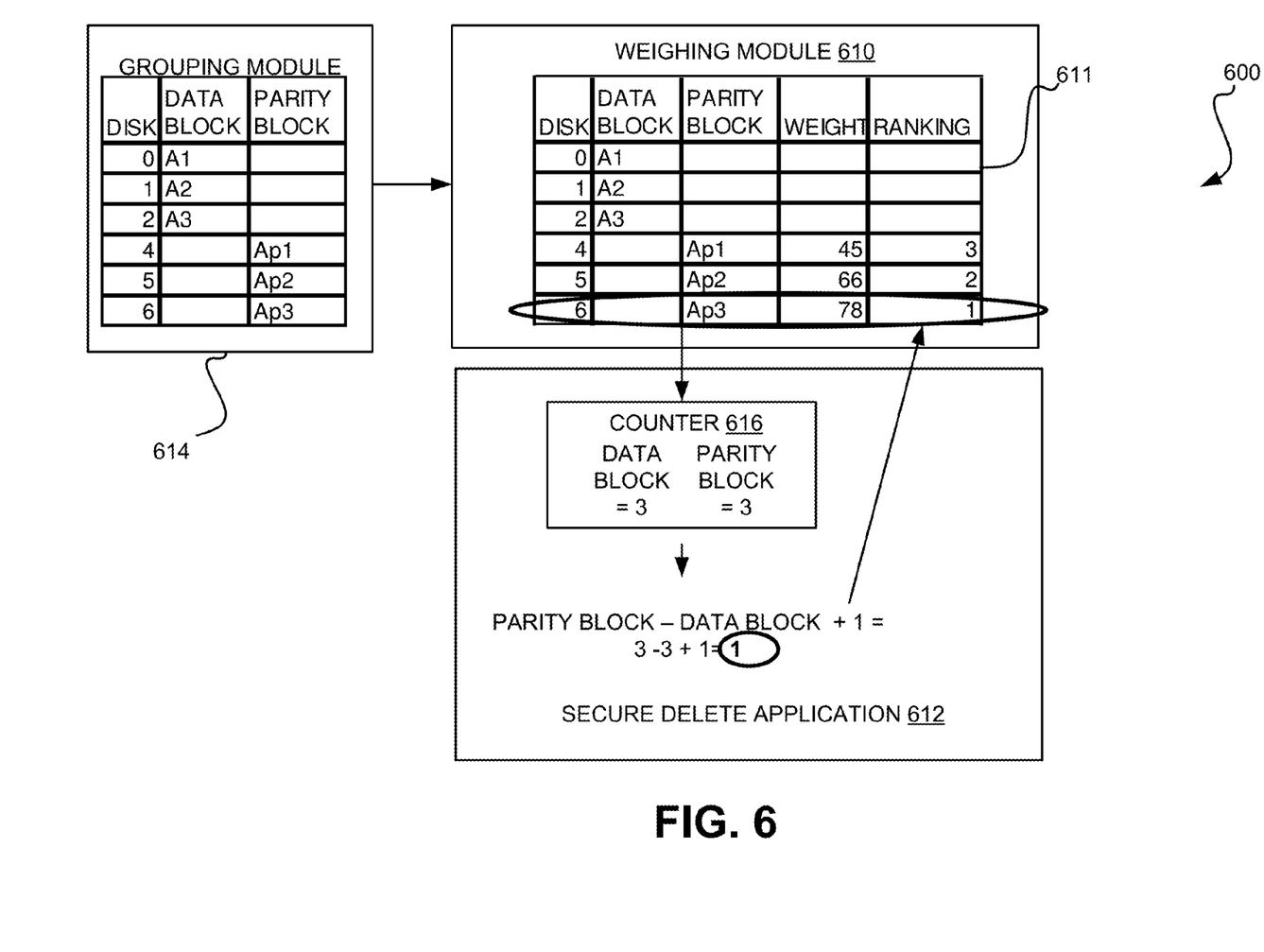
FIG. 6 illustrates the interaction between a system of modules that can rank the parity blocks, according to various embodiments.

FIG. 6 illustrates the interaction between a system 600 of modules that can rank the parity blocks, according to various embodiments. The system 600 can have, a weighing module 610, a secure delete application 612, and a grouping module 614. The grouping module 614 can correspond to the grouping module 114 in FIG. 1. The grouping module 614 can group an application block into a combination of data blocks and parity blocks written onto different disks.

The weighing module 610 can receive the listings of data blocks and application blocks from the grouping module 614. The weighing module 610 can incorporate the set of data and parity blocks and produce a table 611. The table 611 can list the weights and the ranking of each disk in the storage device. The weighing module 610 can determine a weight for a disk using methods described herein. In various embodiments, the weighing module 610 can avoid determining weights to disks containing data blocks since data blocks are likely to have a secure delete operation performed. For example, disks 0-2 are shown without a weight because the data blocks will be deleted and excluded from the ranking.

The weighing module 610 can also determine the rank of the weighed disks. In the shown example, the weighing module ranked disk 6 as the first rank and disk 4 as the last rank based on the weight. In various embodiments, the weighing module 610 can be a part of the secure delete application 612. The weighing module 610 can also be a part of the storage controller. Various aspects of the weighing module 610 can be performed by the storage controller and the secure delete application 612. For example, the weighing of the disks can be performed by the storage controller while the ranking of the disks can be performed by the secure delete application 612.

A secure delete application 612 can determine how many parity blocks to delete by using a counter 616 to count the number of data and parity blocks that are in the storage device and using the number to determine the number of parity blocks to delete. In the shown example, the secure delete application 612 determined that there is one parity block to delete. The secure delete application 612 can select the disk with the highest rank and perform a secure delete operation on the corresponding parity block, e.g., Ap3.

Figure 7:
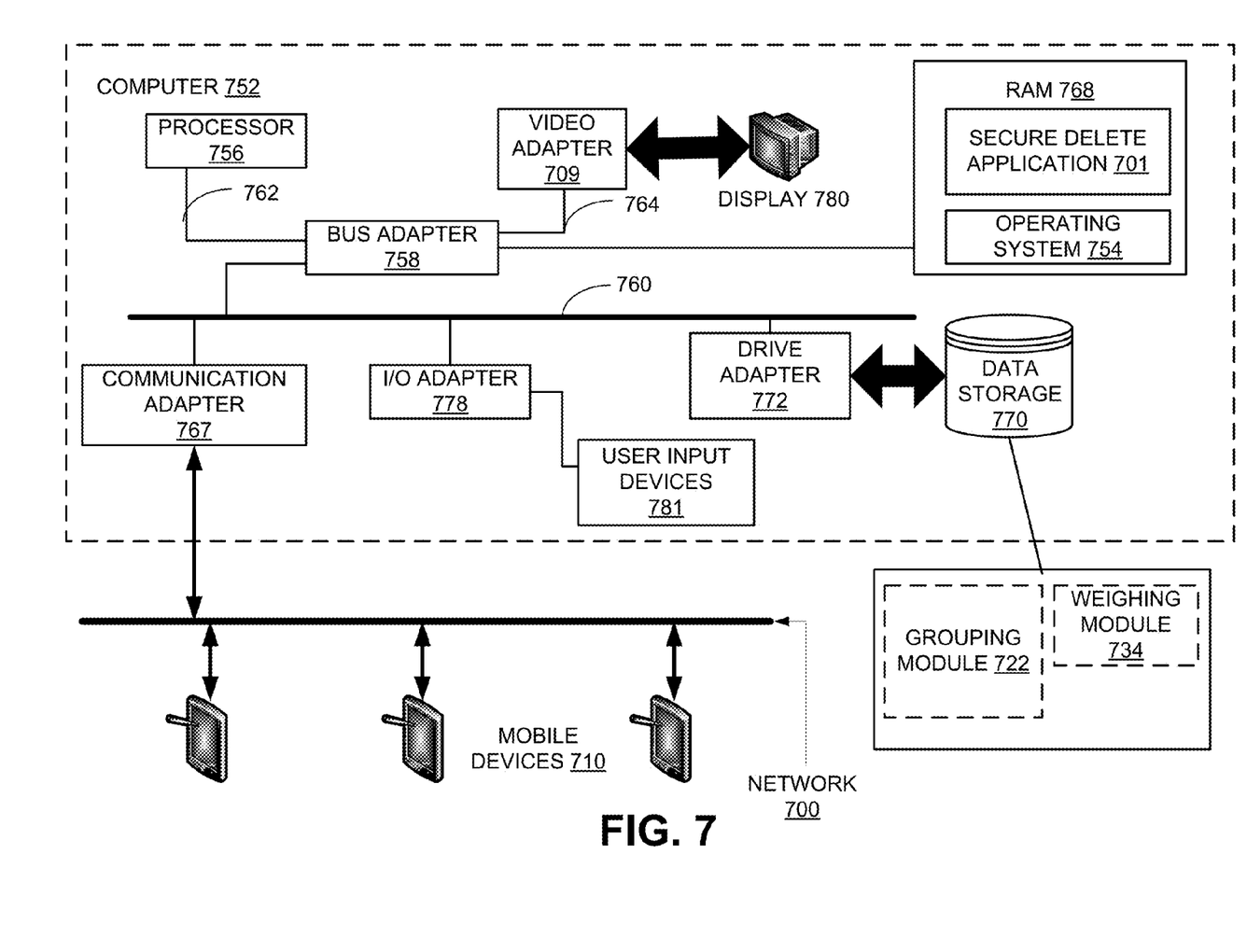
FIG. 7 depicts a block diagram of automated computing machinery, according to an embodiment.

FIG. 7 depicts a block diagram of automated computing machinery, according to an embodiment. The computing machinery can include example computer 752 useful in performing a limited secure delete operation, according to various embodiments. The computer 752 of FIG. 7 includes at least one computer processor 756 or 'CPU' as well as random access memory 768 ('RAM') which is connected through bus adapter 758 to processor 756 and to other components of the computer 752.

Stored in RAM 768 is a secure delete application 701, a module of computer program instructions designed for performing a secure delete operation on data and parity blocks according to embodiments of the present invention. Also stored in RAM 768 is an operating system 754. Operating systems useful for record filtering according to embodiments of the present invention include UNIX®, Linux®, Microsoft XP™, AIX®, IBM's i5/OS™, and others. The operating system 754 and secure delete application 701 are shown in RAM (768), but many components of such software typically are stored in non-volatile memory also, such as, for example, on a disk drive 770.

The computer 752 can also include disk drive adapter 772 coupled through expansion bus 760 and bus adapter 758 to processor 756 and other components of the computer 752. Disk drive adapter 772 connects non-volatile data storage to the computer 752 in the form of disk drive 770. Disk drive adapters useful in computers for filtering records according to embodiments of the present invention include Integrated Drive Electronics (IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The disk drive 770 can be a RAID-configured storage device that includes one or more disk drives. The disk drive 770 can correspond to the storage devices 112 in FIG. 1. In various embodiments, the disk drive adapter 772 can correspond to the storage controller 116 from FIG. 1. The storage controller 116 can also be a part of the disk drive 770. The disk drive data storage can also include the grouping module 722 and the weighing module 734

The example computer 752 includes one or more input/output ('I/O') adapters 778. I/O adapters implement user-oriented input/output through, for example, software drivers and computer hardware for controlling output to display devices such as computer display screens, as well as user input from user input devices 781 such as keyboards and mice. The example computer 752 includes a video adapter 709, which is an example of an I/O adapter specially designed for graphic output to a display device 780 such as a display screen or computer monitor. Video adapter 709 is connected to processor 756 through a high speed video bus 764, bus adapter 758, and the front side bus 762, which is also a high speed bus.

The example computer 752 includes a communications adapter 767 for data communications with other computers 710, e.g., mobile devices, and for data communications with a data communications network 700. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for virtual machine migration according to embodiments of the present invention include modems for wired dial-up communications, Ethernet (IEEE 802.3) adapters for wired data communications network communications, and IEEE 802.77 adapters for wireless data communications network communications.

A mobile device 710 can have local programs that are separate from the secure delete application 701. The local programs can work in conjunction with the secure delete application 701.

Embodiments of the disclosure can take the form of an entirely hardware embodiment, an entirely software embodiment, or an embodiment containing both hardware and software elements. In one embodiment, the disclosure is implemented in software, which includes but is not limited to firmware, resident software, microcode, etc.

Furthermore, embodiments of the disclosure can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the disclosure have been described and illustrated, the disclosure is not to be limited to the specific forms or arrangements of parts so described and illustrated. The scope of the disclosure is to be defined by the claims appended hereto and their equivalents.

What is claimed is:

1. A method for managing a secure delete operation within one or more storage devices using a parity-based storage scheme, comprising:
    receiving a location of an application block, the application block includes one or more data blocks and one or more parity blocks stored within the one or more storage devices using the parity-based storage scheme;
    determining a number of parity blocks to delete, wherein the number of parity blocks to delete is less than a total number of parity blocks, by:
        determining a probability of reconstructing the application block using only the parity blocks from the one or more parity blocks;
        determining that the probability of reconstructing the application block using only the parity blocks is outside of a probability threshold; and
        determining a number of parity blocks required to be securely deleted for the probability of reconstructing the application block using only the parity blocks to fall within the probability threshold;
    performing the secure delete operation on the determined number of parity blocks; and
    performing the secure delete operation on the one or more data blocks.

2. The method of claim 1, wherein the parity-based storage scheme includes an erasure code protocol.

3. The method of claim 1, further comprising:
    performing a delete operation on remaining parity blocks other than determined parity blocks from the determined number of parity blocks in lieu of the secure delete operation, wherein the delete operation involves fewer overwrites than the secure delete operation.

4. A system for managing a secure delete operation within storage devices using a parity-based storage scheme, comprising:
    one or more storage devices using a parity-based storage scheme;
    at least one processor;
    at least one memory coupled to the processor, wherein the memory comprises instructions which, when executed by the processor, cause the processor to:
    receive a location of an application block, the application block includes one or more data blocks and one or more parity blocks stored within the one or more storage devices using the parity-based storage scheme;
    determine a number of parity blocks to delete, wherein the number of parity blocks to delete is less than a total number of parity blocks, by:
        determining a probability of reconstructing the application block using only the parity blocks;
        determining that the probability of reconstructing the application block using only the parity blocks is outside of a probability threshold; and
        determining a number of parity blocks required to be securely deleted for the probability of reconstructing the application block using only the parity blocks to fall within the probability threshold;
    perform the secure delete operation on the determined number of parity blocks; and
    perform the secure delete operation on the one or more data blocks.

5. The system of claim 4, wherein the parity-based storage scheme includes a RAID protocol.

6. The system of claim 4, further comprising:
    perform a delete operation on parity blocks other than determined parity blocks from the determined number of parity blocks in lieu of the secure delete operation, wherein the delete operation is involves fewer overwrites than the secure delete operation.

7. A computer program product for managing a secure delete operation within storage devices using a parity-based storage scheme, the computer program product comprising a non-transitory computer readable storage medium having program code embodied therewith, the program code comprising computer readable program code configured to:
    receive a location of an application block, the application block includes one or more data blocks and one or more parity blocks stored within the one or more storage devices using the parity-based storage scheme;
    determine a number of parity blocks to delete, wherein the number of parity blocks to delete is less than a total number of parity blocks, by:
        determine a probability of reconstructing the application block using only the parity blocks;
        determine that the probability of reconstructing the application block using only the parity blocks is outside of a probability threshold; and
        determine a number of parity blocks required to be securely deleted for the probability of reconstructing the application block using only the parity blocks to fall within the probability threshold;
    perform the secure delete operation on the determined number of parity blocks; and
    perform the secure delete operation on the one or more data blocks.

8. The computer program product of claim 7, wherein the parity-based storage scheme includes a Redundant Array of Independent Disks (RAID) protocol.

9. The computer program product of claim 7, wherein perform a secure delete operation on the determined number of parity blocks includes:

perform a delete operation on parity blocks other than the determined parity blocks from the determined number of parity blocks in lieu of the secure delete operation, wherein the delete operation involves fewer overwrites than the secure delete operation.

* * * * *